United States Patent Office 3,000,984
Patented Sept. 19, 1961

3,000,984
CONDENSED AROMATIC HYDROCARBONS
André Laurent Halleux, Brussels, Belgium, assignor to Union Carbide Corporation, a corporation of New York
No Drawing. Filed Dec. 12, 1957, Ser. No. 702,233
8 Claims. (Cl. 260—668)

The present invention relates to novel highly condensed aromatic hydrocarbons. More particularly, it relates to highly condensed aromatic hydrocarbons having a large number of rings in their structure.

The preparation of condensed aromatic hydrocarbons has been the source of many activities, especially in connection with the production of dyes. More recently, the attention has been stressed upon the fluorescent properties of said hydrocarbons and upon their sensitivity for detecting radiations. This had led to a search for new condensed aromatic hydrocarbons, in particular for new compounds having a large number of condensed rings in their structure. The synthesis of the latter is difficult to achieve. In many cases, the starting materials which one has to use are unreactive or so insoluble, that one has to have recourse to quite vigorous methods in order to obtain some results. Even so, the formation of numerous by-products cannot be avoided as well as substantial decomposition of the reactants.

It is an object of the present invention to provide a new and useful series of highly condensed aromatic hydrocarbons and a process for making the same by catalytic cyclization of a polyarylated benzene derivative, said cyclization being conducted at a temperature such as to avoid simultaneous decomposition of the hydrocarbons.

It is another object of the present invention to provide said hydrocarbons at the highest degree of condensation, as well as said hydrocarbons at intermediate degree of condensation. Other objects of the invention will appear from the description which follows.

The novel compounds herein disclosed comprise highly condensed aromatic hydrocarbons of general formula $C_nH_m$ wherein $n$ is an integer equal to 42 and $m$ is an integer consisting of 18, 20, 22, 24, 26, 28 and their chloro derivatives, said hydrocarbons being characterized by a number of condensed rings consisting of 8, 9, 10, 11, 12 and 13. Thus the novel compounds falling into the scope of the present invention include hexabenzocoronene, tetrabenzoperopyrene, tetrabenzobisanthene.

The said novel compounds result from the discovery that the cyclization of poly-arylated benzene derivatives, such as hexaphenylbenzene, for instance, can be conducted without simultaneous decomposition of the hydrocarbons and leads to highly condensed aromatic hydrocarbons having a large number of rings in their structure.

The products of the invention can be obtained by cyclization of hexaphenylbenzene into partially or completely condensed aromatic hydrocarbons, said cyclization being conducted in a liquid melt of an alkali chloride and aluminium trichloride, the weight ratio of said alkali chloride to said aluminium trichloride of from about 1:3.5 to about 1:5.0.

The temperature of reaction will preferably be low enough to avoid substantial decomposition of the hydrocarbons and the cyclization will preferably be performed at 120–130°. The aluminium trichloride is essential to the reaction, whilst for the other component, any alkali halide can be used although sodium chloride is preferred.

Thus, for instance, when hexaphenylbenzene ($C_{42}H_{30}$) is heated at 120–130° C. in presence of a 1:4.5 $AlCl_3$—NaCl mixture, a cyclization by dehydrogenation occurs without simultaneous decomposition of the starting material. The removal of 12 hydrogens takes place at each of the carbon atoms which, by its position, is the most susceptible to complete a six carbon ring. After cooling and acidification, the reaction product is extracted first with dioxane and second with pyridine, and then purified by sublimation under reduced pressure. The crystalline compound so obtained is yellow-orange in colour, has a strong fluorescence and a melting point superior to 600° C. This product, which corresponds to the formula $C_{42}H_{18}$, has been identified as 1.12, 2.3, 4.5, 6.7, 8.9, 10.11 hexabenzocoronene. It represents the highest degree of condensation compatible with a formula having 42 carbon atoms and which is obtained by cyclization of hexaphenylbenzene.

This reaction can be represented by the following schematic equation:

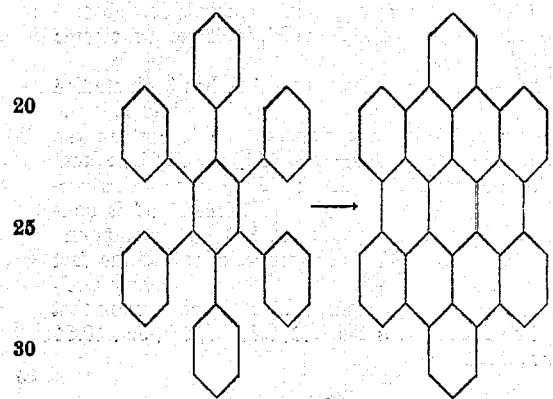

It is apparent that the hexachloro derivative of hexabenzocoronene, namely the 1.12, 2.3, 4.5, 6.7, 8.9, 10.11 hexa (5'. chloro) benzocoronene will be obtained by means of the same cyclo-dehydrogenation when the starting material is the hexa p. chloro derivative of hexaphenylbenzene which is obtained by means of a Diels-Alder reaction from tetra(p. chlorophenyl) cyclopentadienone and p.p' dichlorotolane.

Other novel compounds falling into the scope of the present invention and which can be obtained by cyclization of hexaphenylbenzene are condensed aromatic hydrocarbons consistent with the general formula $C_nH_m$ wherein $n$ is an integer equal to 42 and $m$ is an integer consisting of 24, 26 and 28 and their chloro derivatives, said hydrocarbons being partially cyclized hexaphenylbenzene and characterized by a number of rings consisting of 8, 9 and 10.

The preparation and the properties of the novel compounds falling into the scope of the present invention will be more readily understood by reference to the following purely illustrative examples.

Example 1

To 1 gr. of hexaphenylbenzene ($C_{42}H_{30}$) is added 1 gr. of NaCl and 4.5 gr. of $AlCl_3$ and the three components are thoroughly mixed. This mixture is heated at 120–130° C. for 2½ hours with dry air blowing over the system during this period. The crude reaction product, which is black in color, is then cooled, poured onto acidified ice and filtered. The precipitate is then treated with HCl (1:4) under reflux for ½ hour, and then filtered, washed and finally dried. The product is submitted to a first extraction with dioxane, in order to remove the excess of non-reacted hexaphenylbenzene and to a second extraction with pyridine. The extraction residue is then sublimated several times between 400 and 500° C. under $10^{-4}$ mm. of mercury. The purified product herein referred as compound A, is a lamellar, orange, crystalline product, practically insoluble in all solvents;

it has a melting point superior to 600° C. and it shows a strong fluorescence.

Analysis of product A is consistent with the formula $C_{42}H_{18}$ corresponding to hexabenzocoronene and gives the following results:

|  | Percent by weight | |
|---|---|---|
| calculated | C, 96.5 | H, 3.5 |
| found | C, 95.6 | H, 3.7 |

Since said hexabenzocoronene is not described in the literature, additional experiences were conducted in order to confirm the structure of this novel compound as well as to establish its properties.

Subsequent treatment of said compound A by an $AlCl_3 + NaCl$ mixture, followed by purification, does not alter the final product which is identical with A. The latter appears then as a completely cyclized compound. The infra-red spectroscopy spectrum shows a few absorption bands between 2 and 15μ which indicates a molecule of high symmetry.

The crystal structure of compound A has been studied by X-rays, using the oscillating crystal method and the CuK radiation. The dimensions of the lattice are the following: $a=18.6$ A., $b=6.14$ A., $c=12.9$ A. and $\beta=113°$. The crystal density is 1.57 gr./cc. which corresponds to a molecular weight of $534 \pm 20$ and is consistent with the calculated value of 523 for a compound of formula $C_{42}H_{18}$. All these results, added to the fact that the compound A shows a molecular symmetry analogous to that one of coronene, lead to the conclusion that the novel compound A is the 1.12, 2.3, 4.5, 6.7, 8.9, 10.11 hexabenzocoronene.

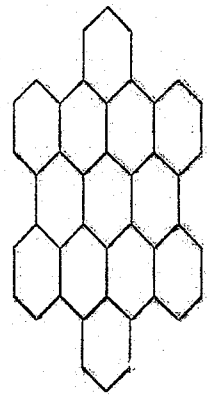

Besides the said hexabenzocoronene, the cyclodehydrogenation of hexaphenylbenzene gives also several reaction products which are fluorescent and correspond to partially cyclized hexaphenylbenzene, namely hexabenzo-triphenylene ($C_{42}H_{24}$), 9.10.diphenyl tetrabenzanthracene ($C_{42}H_{26}$) and 5.6, 7.8 tetraphenyltriphenylene ($C_{42}H_{28}$). The uncompletely cyclized structure of said compounds is confirmed by their infra-red spectra and by the fact that a subsequent treatment with $AlCl_3 + NaCl$ leads ultimately to hexabenzocoronene.

Example II

In order to confirm the spatial configuration of said hexabenzocoronene, a second and independent synthesis of said compound has been performed by using dibenzanthrone as a starting material.

To 2 gr. of 1.9, 2.3.dibenzanthrone ($C_{21}H_{12}O$) is added 2 gr. of Zn in powder and 10 gr. of $ZnCl_2$, melted and dehydrated under vacuum. The three components are thoroughly mixed and the system is heated at 330–350° C. during 45 minutes. The reaction mixture, which is now black in color, is first cooled at room temperature and second heated with 150 cc. of diluted HCl. The aqueous suspension is then boiled and filtered. The filtrate is washed and dried.

A first extraction of the crude product with boiling dioxane gives a dark solution showing a strong green fluorescence, said solution being referred to as fraction B. This fraction is passed over a chromatographic column filled up with $Al_2O_3$ in order to eliminate impurities. The eluant is then sublimated at 180–200° C. in order to remove the non-reacted dibenzanthrone; the residue of sublimation is dissolved into pyridine and the solution so obtained is submitted to a fractionated crystallization. This process gives red, strongly fluorescent crystals of B which, after recrystallization in xylene, have a melting point of 381–383° C. (non corrected), are soluble in concentrated $H_2SO_4$ and are consistent with the formula $C_{42}H_{20}$ (molecular weight: 522.58) as shown by the following analysis:

|  | Percent by weight | |
|---|---|---|
| calculated | C, 96.2 | H, 3.8 |
| found | C, 96.1 | H, 4.2 |

Subsequent treatment of crystals B with $AlCl_3 + NaCl$ mixture, according to the treatment described in Example I, leaves the product unchanged. A study of its U.V. spectrum leads to the conclusion that compound B is the 1.2, 3.4, 8.9, 10.11 tetrabenzobisanthene which corresponds to the following structure:

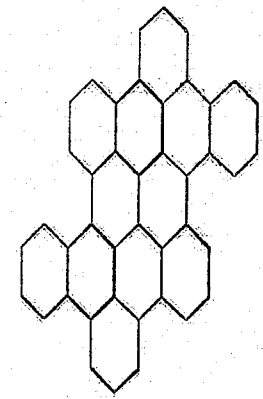

It is noteworthy that crystals B do not correspond to the following structure:

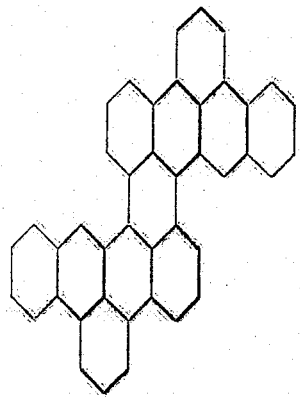

which is identified as 1.9.5.10.di(1'.10') phenanthryleneanthracene by comparison of the U.V. spectra of both substances. The synthesis of 1.9.5.10.di(1'10') phenanthrylene-anthracene has been conducted independently and obtained by the cyclodehydrohalogenation of 1.5.dichloro 9.10 diphenanthrylanthracene.

The residue of the first extraction is, in turn, extracted with pyridine and gives a dark brown, strongly fluorescent compound, herein referred as fraction C.

The compound is first sublimated between 400 and 430° C. under 10⁻⁴ mm. of Hg, then recrystallized in xylene and finally passed over a chromatographic column filled up with Al₂O₃. After purification, fraction C appears as yellow, strongly fluorescent crystals of melting point 461–462° C. (non corrected) which are soluble in concentrated H₂SO₄. Compound C is thermochromic in the solid state and takes reversibly a red color at 150° C. Analysis shows that this compound is consistent with the formula C₄₂H₂₂ (molecular weight: 526.66):

|  | percent in weight | |
| --- | --- | --- |
| calculated | C, 95.8 | H, 4.2 |
| found | C, 95.7 | H, 4.3 |

Study of the U.V. spectrum of compound C leads to the conclusion that this novel compound is the 4.5, 6.7, 11.12, 13.14 tetrabenzoperopyrene which corresponds to the following structure:

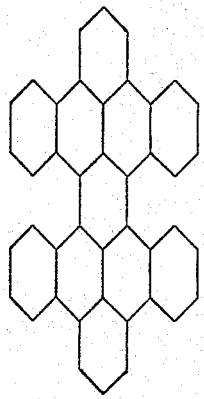

The residue of the second extraction is in turn sublimated at 450–500° C. under 10⁻⁴ mm. of Hg purified by a new extraction with pyridine and successive sublimations at 500° C. under 10⁻⁴ mm. of Hg. The crystals so obtained are identical to those of compound A identified as hexabenzocoronene.

*Example III*

To 50 mgr. of 4.5, 6.7, 11.12, 13.14 tetrabenzoperopyrene is added 50 mgr. of NaCl and 225 mgr. AlCl₃ and the three compounds thoroughly mixed. This mixture is then heated during 30 minutes at 120–130° C. with dry air blowing over the system during this period. The crude product, which is black in color, is subsequently treated according to the process described in Example I. The reaction product is extracted, in a similar fashion, with pyridine and finally sublimated between 450 and 500° C. under 10⁻⁴ mm. of Hg. The crystals so obtained are identified as hexabenzocoronene.

It is noteworthy that tetrabenzoperopyrene does not cyclize into hexabenzocoronene when the former is treated with a Zn+ZnCl₂ mixture according to the process described in Example II.

Of course it is apparent that the substitution of hexa p. chloro phenyl benzene for the hexa phenyl benzene will result in the chloro derivatives of the condensed rings of the above examples. These chloro derivatives have displaceable reactive groups available for synthesis into high molecular weight materials as polymers, dyes, etc.

The novel compounds of the invention are characterized by their fluorescent properties and by their excellent resistance to high temperature. In particular the highly condensed hydrocarbons corresponding to the formula C₄₂H₁₈, C₄₂H₂₀ and C₄₂H₂₂ are pale yellow or yellow-orange crystals, of melting point approximately equal or superior to 400° C., showing a very strong fluorescence. Due to their highly condensed aromatic structure and from their reported crystal colors, absorption spectra and very strong fluorescent properties, it is clear that said hydrocarbons can be used for counting radiations such as β or γ particles for instance, when a crystal of said hydrocarbons is coupled with a photomultiplier, so placed as to collect the maximum amount of light radiated by the crystal, and followed by an amplifier. It is possible to compute that the scintillation efficiency of said hydrocarbons will be several times higher than that one of anthracene, which is known to be one of the best organic scintillation counters and which is widely used, as such, for detecting radiations.

From the high temperature resistance of hexabenzocoronene, which shows a melting point superior to 600° C., it is obvious that this particular compound will be an exceptionally useful scintillation counter when in contact with hot sources and will permit to record the radiation phenomena occurring for instance in reactors, as well as the effect of radiations at high temperature. For those hydrocarbons of the invention, characterized by a lower degree of condensation and corresponding to the formula C₄₂H₂₄, C₄₂H₂₆ and C₄₂H₂₈, their spatial configuration associated with their fluorescent properties and their low solubility in most of the usual solvents, indicate that they can be used as dye intermediates. The said partially cyclized hydrocarbons can be submitted to an ultimate cyclodehydrogenation and are, therefore, useful as intermediates in the synthesis of completely cyclized condensed hydrocarbons such as hexabenzocoronene.

As many apparently widely different embodiments of this invention may be made without departing from the spirit and scope hereof, it is to be understood that the invention is not limited to the specific embodiments hereof except as defined in the appended claims.

What is claimed is:

1. A condensed aromatic hydrocarbon having the general formula C₄₂Hₘ wherein $m$ is an even-numbered integer within the range of 18 through 28, said condensed aromatic hydrocarbon having at least one triphenylene nucleus and having a minimum of four rings condensed together and a maximum of 13 rings condensed together, with the total number of rings present in the compound being from 8 to 13.

2. A condensed aromatic hydrocarbon having the general formula C₄₂Hₘ wherein $m$ is an even-numbered integer within the range of 18 through 22, said condensed hydrocarbon having a minimum of eleven rings condensed together and a maximum of 13 rings condensed together, with the total number of rings present in the compound being from 11 to 13.

3. The chloro-derivatives of the compounds as claimed in claim 1.

4. The chloro-derivatives of the compounds as claimed in claim 2.

5. 1.12, 2.3, 4.5, 6.7, 8.9, 10.11 hexabenzocoronene.

6. 1.2, 3.4, 8.9, 10.11 tetrabenzobisanthene.

7. 4.5, 6.7, 11.12, 13.14 tetrabenzoperopyrene.

8. The process of catalytically cyclodehydrogenating hexaphenylbenzene, which comprises conducting said cyclodehydrogenation in a liquid melt of a mixture comprising an alkali chloride and aluminum trichloride, the weight ratio of said alkali chloride to said aluminum trichloride being from about 1:3.5 to 1:5.0.

References Cited in the file of this patent

UNITED STATES PATENTS 2,126,360   Vollman _____ Aug. 9, 1938

OTHER REFERENCES

Annalen der Chemie (French), Justus Leibigs, volume 558, 1947, pp. 207–210 relied on.